United States Patent [19]

Talbot

[11] Patent Number: 4,555,805

[45] Date of Patent: Nov. 26, 1985

[54] SECURE MOBILE TELEPHONE SYSTEM

[75] Inventor: Robert D. Talbot, Pittsford, N.Y.

[73] Assignee: Harris Corporation, Melbourne, Fla.

[21] Appl. No.: 489,025

[22] Filed: Apr. 27, 1983

Related U.S. Application Data

[63] Continuation of Ser. No. 130,345, Mar. 14, 1980, Pat. No. 4,411,017.

[51] Int. Cl.$^4$ ............................................. H04L 9/00
[52] U.S. Cl. ........................................ 455/26; 455/27
[58] Field of Search ................................... 455/26–30; 375/2.1, 2.2; 179/1.5 R

[56] References Cited

U.S. PATENT DOCUMENTS

| | | | |
|---|---|---|---|
| 3,610,828 | 10/1971 | Girard et al. | 455/26 |
| 3,651,404 | 3/1972 | Rollins | 455/26 |
| 3,696,297 | 10/1972 | Otero | 455/26 |
| 4,077,005 | 2/1978 | Bishop | 455/26 |
| 4,182,933 | 1/1980 | Rosenblum | 375/2.1 |
| 4,334,322 | 6/1982 | Clark, III | 455/26 |
| 4,378,551 | 3/1983 | Drapac | 455/26 |
| 4,411,017 | 10/1983 | Talbot | 455/26 |

OTHER PUBLICATIONS

CCMSAT Tech. Rev. (USA) S91740070, vol. 9, No. 1, (Spring 1979) A Multiple-Destination Cryptosystem for Broadcast Networks, Lee et al, pp. 25–35.

*Primary Examiner*—Sal Cangialosi

*Attorney, Agent, or Firm*—L. Lawton Rogers, III

[57] ABSTRACT

A communications system including a central station and a plurality of remote stations, for example, a mobile telephone system, is disclosed in which communications channel establishing signalling transmissions between the central and remote stations are conducted in a clear (unenciphered) mode and subsequent voice transmissions between the central and remote stations are conducted in a secure (enciphered) mode. Each remote station has a unique code assigned thereto which is used by it to at least decipher incoming enciphered voice transmissions from the central station and by the central station to encipher outgoing voice transmissions to the remote station. The unique code may also be used by the remote station to encipher outgoing voice transmissions and by the central station to decipher incoming voice transmissions from the remote station. Alternatively all remote station outgoing voice transmissions may be enciphered with a code common to all remote stations which code is used by the central station for deciphering incoming voice transmissions. The central station can automatically, or in response to a specific request for secure service, switch its equipment to the secure mode upon completion of communications channel establishing signalling transmissions between it and a remote station and can control remote station switching to the secure mode by sending an enciphered voice transmission to the remote station which responds to receipt thereof by switching to the secure mode.

28 Claims, 5 Drawing Figures

SECURE MOBILE TELEPHONE SYSTEM

This is a continuation, of application Ser. No. 130,345, filed Mar. 14, 1980 now U.S. Pat. No. 4,411,017.

BACKGROUND OF THE INVENTION

The present invention generally relates to communications systems in which a central station selectively communicates with one or more of a plurality of remote stations over communications channels established between the central and remote stations. The invention more particularly relates to mobile telephone systems in which a base station selectively communicates over radio frequency (RF) channels with one or more mobile stations.

Mobile telephone RF systems typically have a terminal at a base station which is capable of establishing a communications path over a selected channel between a calling and called mobile station as well as between mobile stations and called or calling landline parties. Conventionally, signalling transmissions, e.g., tones, are used to establish a communications path between the base and a mobile station following which voice transmissions between the two stations occur. The signalling and voice transmissions between the base station and a mobile station communicating therewith are in a clear, i.e. not secure, mode in that both may be detected and monitored by others by merely tuning in on their shared communications channel.

Various proposals have been suggested for providing secure transmissions, particularly voice transmissions, between a base and mobile station. One such proposal is to encipher transmitted and decipher received signalling and voice transmissions between the base and mobile stations with a common code. In such a system, specialized deciphering equipment would be required to detect and monitor both signalling and voice transmissions between a base and mobile station. However, while this proposal increases privacy of communications, all mobile stations of a mobile telephone system would have the same enciphering/deciphering code associated therewith so that each may receive common tone signalling information, e.g., idle channel tones, emitted by the base station and intended to be received by all mobile stations. As a result, a mobile station of the system would still detect and monitor signalling and voice communications between the base station and a different mobile station. Accordingly, although improved privacy is ensured against outsiders to the system, users of a mobile telephone system employing such techniques are still not guaranteed complete privacy in their communications.

Moreover, it has been discovered that the use of enciphering/deciphering techniques for the signalling portion of the system requires more stringent system design requirements since accurate enciphering and deciphering of transmitted and received signalling, e.g., tone, signals is more difficult than is the case for audio (voice) signals, causing increased signalling errors between a base station and remote station.

Other attempts at providing some measure of security have included furnishing the base and mobile stations with a manually operable switch which permits operators at communicating base and mobile stations to switch their respective units between a clear and secure mode. In the clear mode normal transmissions occur, while transmissions are enciphered in the secure mode. Such a system is described in the paper entitled "A Digitally Encoded Voice Encryption System" by Robert E. Bailey presented at the I.E.E.E. Twenty-Seventh Annual Vehicular Techniogy Conference, Mar. 16–18, 1977. However, the use of a manually manipulatable clear/secure switch causes problems in that both the base station and mobile station must be set to the same clear or secure mode to ensure that both stations are operating in the same format. If the two stations are not set in the same mode, signalling and voice transmissions will not properly occur.

The present invention has been designed to overcome the above deficiencies in existing and proposed communications systems providing a very private communications system which does not require mannual switching to a secure mode. It has particular applicability to mobile telephone systems, although the principals of the invention are also applicable to any communications system having a central station, and a plurality of remote stations which can communicate with the central station.

One object of the present invention is to provide a simple, reliable, yet highly effective method and apparatus for automatically, or on request, establishing a secure voice transmission channel between a base and mobile station after completion of signalling transmissions between them incident to establishing their shared communications path over a selected channel.

An additional object of the present invention is to provide a method and apparatus for establishing an extremely secure voice transmission channel in a mobile telephone communications system by using a unique code assigned to each mobile station of the system for use by a communicating mobile station at least in deciphering voice transmissions transmitted thereto and the base station in enciphering voice transmissions to the communicating mobile station. The unique code can also be used by the mobile station to encipher voice transmissions to the base station, with the base station using the unique code to decipher an incoming voice transmission from a particular mobile station. Alternatively, all mobile stations may encipher outgoing voice transmissions with a common code, which is also used by the base station to decipher incoming voice transmissions.

An additional object of the present invention is to provide a method and apparatus for establishing a secure voice transmission channel in a mobile telephone system in which the base station after completion of signalling which establishes the communication channel between it and a mobile station, immediately, or in response to a secure service request by a calling or called party switches itself to a secure mode in which voice transmissions to and from the base station are respectively deciphered and enciphered with the code(s) corresponding to that of the mobile station with which it is communicating.

Still another object of the present invention is to provide a method and apparatus for establishing a secure voice transmission path in a mobile telephone system in which each mobile station is responsive to receipt of an enciphered voice transmission from a base station to switch from a clear to a secure mode in which voice transmissions from and to said mobile station are respectively enciphered and deciphered.

These and other objects and advantages of the invention will become clear from the detailed description

DETAILED DESCRIPTION OF THE INVENTION

As referred to hereinbelow, the term "clear" means a transmission of information in an unenciphered form, while the term "secure" refers to a transmission which has been enciphered with a particular code for transmission and which must be deciphered with a corresponding code in order to recover the information contained therein.

Although the invention is described below in connection with the environment of a mobile telephone system, this is merely for convenience of explanation as the principals of the invention can be applied to any centralized communications system having a central station communicating with a plurality of remote stations. Moreover, although the invention is described with particular reference to tone signalling and voice communications, it can also be used with any signalling and information transmission format desired. For example, secure information transmissions are described below as being voice signals; the invention, however, could also be used to secure other information transmissions, e.g. data transmissions.

In a mobile telephone station employing the invention, a unique code is first assigned to each mobile station. The code is used by the mobile station to decipher voice transmissions received by the mobile station. The base station includes an apparatus for selecting the unique code corresponding to a remote station with which it is communicating and uses this code to encipher voice transmissions to the remote station. This unique code can also be used by the mobile station to encipher voice transmissions to the base station and by the base station to deencipher the same. However, since complete system privacy can be assured if each mobile station is incapable of receiving a message intended for another party, and this is accomplished by using the unique code at each remote station for deciphering purposes, the mobile stations may use a commonly assigned code for enciphering their respective transmissions. In other words, each mobile station is assigned a unique deciphering code, while all mobile stations can be assigned a common enciphering code. Having a common remote station enciphering code eliminates part of the code programming required at the base station as described below.

All signalling communications which are conventionally used to establish a communications channel between the base station and mobile station are retained and system switching to a secure mode occurs upon completion of normal signalling. Typically, such signalling is conducted using tones and the ensuing description will refer to tone signalling.

The base station senses completion of tone signalling incident to establishing a communications path with a mobile station and thereafter switches automatically, or only in response to receipt of a secure service request signal from a called or calling party, to a secure mode causing voice transmissions originating therefrom to be enciphered for transmission to a communicating mobile station. The secure service request signal may be a special code dialed by a called or calling party. The mobile station for its part detects receipt of an enciphered voice transmission from the base station and automatically switches to a secure mode so that voice transmissions originating at the mobile station are properly enciphered.

By using a deciphering code unique to each mobile station, a mobile telephone system is obtained having a high degree of voice transmission privacy between mobile stations as one mobile station cannot decipher a voice transmission which was enciphered with a code unique to a different mobile station. Thus complete privacy is assured for voice transmissions between the base station and each mobile station.

Since switching from a clear mode in which all tone signalling occurs to the secure mode in which the voice transmissions are enciphered in both the base and communicating mobile station occurs automatically, or only in response to a secure service request signal, the invention ensures that the base station and mobile station with which it is communicating are both in a clear mode during tone signalling and both in secure mode for subsequent voice transmissions.

Figure 1:
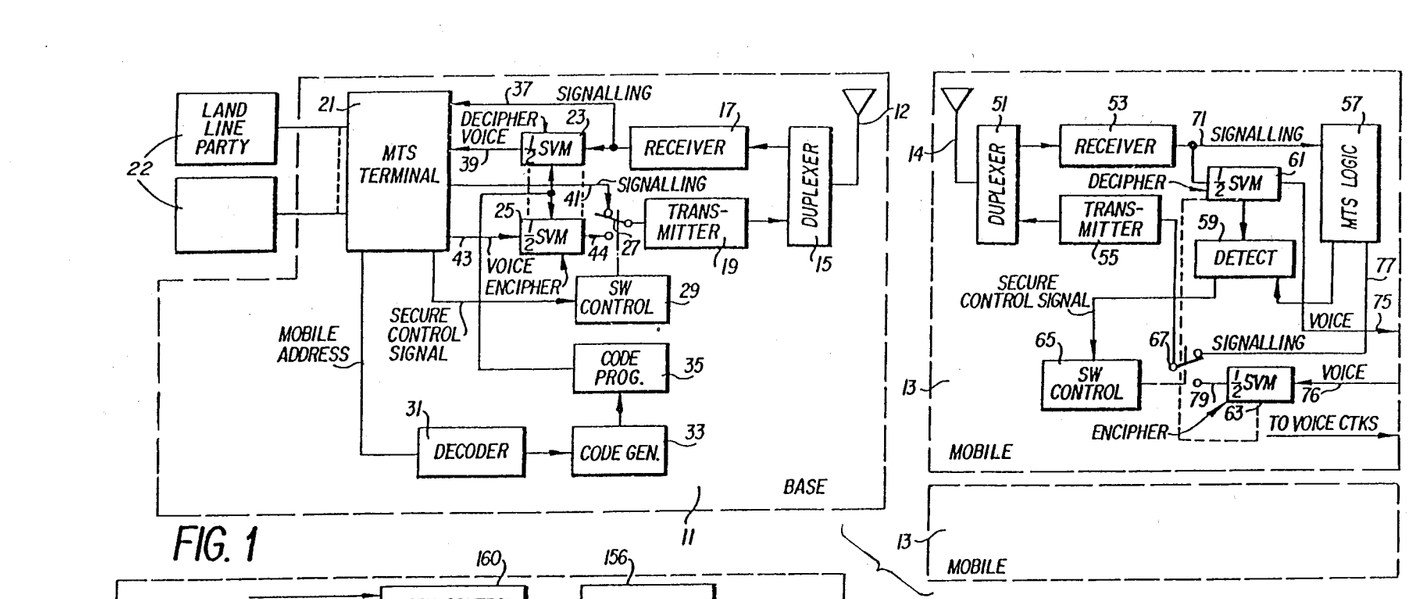
FIG. 1 illustrates a first embodiment of the invention as applied to a mobile telephone system including a base and mobile station.

As a specific example of the invention, FIG. 1 illustrates a mobile telephone system constructed in accordance therewith wherein a base station is denoted by numeral 11 and each of a plurality of mobile stations is denoted by numeral 13.

BASE STATION

The base station 11 includes an antenna 12 feeding into a duplexer 15 to which is connected a channel receiver 17 and channel transmitter 19 in conventional fashion. The output of receiver 17 which may contain either tone signalling or voice information from a mobile station is respectively supplied by signalling and voice signal input paths 37 and 39 to a conventional mobile telephone system terminal 21. Respective signalling and audio signal output paths 41 and 43 from terminal 21 are also provided in conventional fashion. The terminal 21 includes the conventional control and switching logic for establishing a communications channel between calling and called mobile parties or between a mobile party and, via a telephone system central office, a calling or called land line party 22. Since the construction and operation of terminal 21 is well known in the art, a detailed description thereof is not repeated herein. A representative mobile telephone system including a representative terminal 21 is the commercially available Harris Corporation "HICOM" system.

To enable secure communications to and from base station 11, the audio signal paths 39 and 43 to and from terminal 21 are respectively provided with deciphering 23 and enciphering 25 portions of a programmable secure voice module. A programmable secure voice module is an enciphering/deciphering device to which an analog audio, e.g. voice, signal is applied together with a digital enciphering code and which produces an enciphered digital output; and to which is applied a digital deciphering code and an enciphered digital signal (enciphered with the same code as the decihering code) and which produces an analog output signal. The enciphering portion of a secure voice module includes an internal analog-to-digital converter for converting the applied analog signal to digital format and then a scrambling device for enciphering the digitized version of the analog signal in accordance with the applied enciphering code signal. Thus, one output of the secure voice module is an enciphered i.e. logically scrambled, digital version of an applied audio signal. The deciphering portion of a secure voice module includes a digital deciphering device receiving an enciphered digital signal and a deciphering code for unscrambling an applied digital enciphered signal. The output of the deciphering device is fed to a digital to analog converter to recover the analog version of the applied signal. In this case, the deciphering code is the same as that applied when the analog signal was originally enciphered. Secure voice modules are, per se, known in the art and commercially available from, for example, Harris Corporation as part of its 1550 series FM mobile telephone system. This representative secure voice module is described in greater detail below in connection with FIG. 5. The Harris series 1550 mobile communications system secure voice module is particularly suited for use in the invention as it can accept a 25 digit (octal) enciphering-/deciphering code thereby providing a sufficiently large number of enciphering/deciphering possibilities. For most purposes, a sufficient number of different enciphering/deciphering codes can be provided when fewer digit positions, such as 3 are made programmable; that is, if fewer than the 25 digit positions are changeable to provide different codes for different mobile stations.

Deciphering portion 23 serves to decipher an enciphered voice transmission signal received from a mobile station 13 providing the deciphered voice transmission to terminal 21. On the other hand, enciphering portion module 25 enciphers voice transmissions from terminal 21 which are transmitted to one of the remote stations 13.

Each of the enciphering and deciphering portions 25 and 23 of the secure voice module can be programmed with an enciphering/deciphering code appropriate to the mobile station 13 with which base station 11 has established a communications path over a selected channel. Since at least unique decihering code exists for each mobile station of the system, privacy is ensured as no mobile station can properly decipher an enciphered voice transmissions intended for a different mobile station.

If the system is arranged so that the mobile stations use different deciphering codes, but the same enciphering code, the enciphering portion 25 and deciphering portion 23 of the secure voice module will have different codes set therein, and the deciphering portion 23 need not have its code programming changed for each different mobile station. If each mobile station uses its unique code for both deciphering and enciphering voice transmissions, the same unique code must be set in enciphering 25 and deciphering 23 portions of the base station secure voice module.

As shown in FIG. 1, the receiving and transmitting signalling lines 37 and 41 over which tone signalling information to and from terminal 21 passes are not connected with the secure voice module. As a result, all tone signalling to and from the base station passes directly to and from terminal 21 in a conventional manner so that the tone signalling as presently used in a mobile telephone system with which the invention is used can be retained. As a result, all communications channel establishing tone signalling transmissions to and from base station 11 remain in the "clear" mode thereby minimizing equipment requirements. In addition, the base station 11 retains its capability of transmitting a tone simultaneously to all mobile stations of the system which might be done, for example, to indicate the availability of a communications channel to all mobile stations by the sending of an "idle" tone over signalling line 41.

Returning to base station 11, a switch 27 is provided for switching the input to transmitter 19 from either a signalling line 41 or a secure voice transmission line 44 connected to the output of enciphering portion 25 of the secure voice module. The switch normally connects the input of transmitter 19 with signalling line 41 and is switched to the enciphering portion 25 output line 44 when a secure control signal is applied to line 45 causing energization of switch control 29. Terminal 21 may automatically provide the secure control signal on line 45 when it detects the establishment of a communications path between it and a calling or called mobile station, whether a call is initiated from a mobile station 13 or from a land line station 22. Thus, the secure control signal is applied to line 45 upon completion of all tone signalling transmissions which establish a communications path over a selected channel between the base station and a particular mobile station. Alternatively, terminal 21 may supply the secure control signal only after receiving a signal from a calling or called party, e.g. a dialed code, requesting secure service.

Terminal 21 also derives the address signal of a calling or called mobile station which is used to select the proper enciphering/deciphering code therefor. The mobile station address signals are applied to a decoder 31 where they are decoded and applied to a code generator 33 which supplies a code corresponding to the mobile station identification address to code programmer 35. Code programmer 35 in turn programs the enciphering 25 portion of the base station secure voice module with the code corresponding to the mobile station with which the base station 11 is communicating. FIG. 1 also illustrates the programming of deciphering portion 23 with the same code as set in enciphering portion 25. This arrangement would be used where each mobile station both enciphers and deciphers voice transmissions with its unique code. If a common enciphering code is used by all mobile stations, then deciphering portion 23 need not be constantly programmed as the common code can be set therein once and remain therein no matter which mobile station is communicating with the base station.

Code generator 33 generates the appropriate base station enciphering code signal, for example, by a table look-up function wherein a code signal for each mobile station 13 of the system is stored. Alternatively, code generator 33 may execute a simple algorithm for deriving a mobile station code signal based on the output of decoder 31.

The code programmer 35 may take the form of a "field code programmer" or a "master code programmer" which are both commercially available from Harris Corporation as respective Product Nos. RF-2961 and RF-2960. For brevity, only the "field code programmer" will be described. This device includes a plurality of manually operated digit weighted switches for selecting a code and a code load switch which is operated to output the selected code to a programmed device. For the purposes of the present application, the manually operated switches may be replaced by electronic switches appropriately controlled by code generator 33 which would also generate a code load signal instructing the code programmer to load the appropriate code into the enciphering and deciphering (if appropriate) portions of the programmable secure voice module.

If the code generator 33 generates the proper enciphering/deciphering code signal by using a table look-up function, it may be constructed as a simple memory device which is addressed in accordance with the output of decoder 31. Alternatively, if an algorithm is used to select the proper code, code generator 33 may take the form of a simple arithmetic and logic processing device.

MOBILE STATION

Each mobile station 13 includes the usual antenna 14, duplexer 51, channel receiver 53 and channel transmitter 55. A mobile telephone system logic circuit 57, also conventional, is also provided for managing the usual tone signalling transmissions between the mobile station and base station. Logic circuit 57, for example, determines when a particular mobile station is being addressed and provides suitable acknowledgement signals to signalling line 77 for transmission back to the base station 11. Logic circuit 57 may also formulate and provide called station and mobile station identification signals for transmission to base station 11 when the mobile station 24 initiates a call. Since the details of the mobile telephone system logic 57 are, per se, well known, a detailed description thereof will be omitted. Reference to the earlier described Harris Corporation 1550 series mobile telephone communications system will provide full details of an exemplary telephone system using an exemplary logic circuit 57.

Each mobile station also includes the usual tone signalling (71,77) and voice signal (75,76) paths which run amoung the receiver 53, transmitter 55, logic circuit 57 and audio (voice) circuits (not shown). In addition, each mobile station 13 includes enciphering 63 and deciphering 61 portions of a secure voice module respectively provided in the voice signal paths (76,75) of the receiver and transmitter. Deciphering portion 61 serves to decipher incoming enciphered voice data, enciphering portion 63 serves to encipher a voice signal taken from the mobile station audio circuits and to apply an enciphered voice signal to transmitter 55 for transmission to the base station. Deciphering portion 61 and enciphering portion 63 operate in a manner identical to respective deciphering 23 and enciphering 25 portions of the base station secure voice module. The only difference is that the secure voice modules of the mobile station need not have its enciphering/deciphering programming changed as each is preset with the appropriate code(s) for the mobile station in which it is contained. Only the base station need have this programming ability (at least for the enciphering path) which enables it to properly enciper and decipher voice transmissions with any one of the mobile stations of the system. The respective enciphering and deciphering codes may be the same in each mobile station, being the unique code assigned to the mobile station, or only the deciphering code may be the unique code, if all mobile stations encipher with a common code.

Each mobile station also contains a switch 67 for switching the input of transmitter 55 between signalling line 77 and an output line 79 from the output of enciphering portion 63 under control of switch control 65. The normal position for switch 67 is, as illustrated in FIG. 1, where the input of transmitter 55 is connected to signalling line 77. Upon application of a secure control signal to switch control 65, switch 67 interconnects the output of the enciphering portion 63 of the secure voice module with the input of transmitter 55. The secure control signal for energizing switch control 65 is provided by an additional logic device 59 added to the mobile station which detects the presence of received data at the output of deciphering portion 61 of the secure voice module. Whenever enciphered voice data is being received, deciphering portion 61 provides a deciphered output therefrom as well as a signal indicating the presence of deciphered data. Logic device 59 detects the deciphered data presence signal and in response thereto provides the secure control signal to switch control 65 causing switch 67 to interconnect the output of enciphering portion 63 with the input to transmitter 55.

GENERAL SYSTEM OPERATION

Operation of the system as illustrated in FIG. 1 will now be described. As in convention mobile telephone systems, a distinct telephone number is assigned to each mobile station. In addition, in accordance with the invention each mobile station is also assigned a distinct and unique code which is used to at least decipher incoming voice transmissions. This unique code, or a common code, is used by the remote station to encipher outgoing voice transmissions. This enciphering/deciphering code(s) is pre-programmed in the secure voice module of each mobile station. The base station generates the unique enciphering code for a particular mobile station with which it has established a communications path over a selected channel from the mobile station address which it either receives from a call initiating mobile station during preliminary tone signalling or from a calling party when a call is initiated to a particular mobile station. The base station also controls switching to the secure mode at both the base and a communicating mobile station by generating the secure control signal, either automatically upon completion of all tone signalling, or after receiving a secure service request signal from a calling or called party.

All tone signalling between the base station and mobile stations presently used in a conventional mobile telephone system is retained and this takes place in a "clear" mode in a conventional manner over signalling lines 37 and 41 in the base station and signalling lines 71 and 77 in the mobile stations.

MOBILE INITIATED CALLS

Assume, for the purpose of explanation, that a mobile station 13 first initiates a telephone call to a particular land line party 22 or another mobile station and both the base station 11 and call originating mobile station 13 are in the condition illustrated in FIG. 1. Logic circuit 57 detects, in a conventional manner, a tone signal e.g. an "idle" signal from the base station indicating the availability of a "free" channel and sends on this channel, via signalling line 77 and transmitter 55, call initiation tone signals which include the number of the called party and the identification address of the mobile station initiating the call. The call initiation signals are detected by base station receiver 17 and furnished to terminal 21 which initiates the usual procedures for finishing the hand shaking tone signalling between the calling mobile station and the base station needed to establish a communications path between them. The hand shaking tone signals are furnished by terminal 21 on signalling line 41 to transmitter 19 and are transmitted to the calling mobile station. Terminal 21 also establishes a separate mobile communications path to a called mobile station via additional channel transmission equipment (not shown) of the base station 11 or a land line communication path between terminal 21 and a called land line party 22, whichever is appropriate. Terminal 21, upon receipt of the identification address from a calling mobile station, furnishes that address to decoder 31 which causes code generator 33 to generate at least an enciphering code unique to the calling mobile station. This code is applied to the enciphering 25 portion of the secure voice module by code programmer 35. If the mobile stations use the unique code assigned them for both enciphering and deciphering voice transmissions, then the output code from code generator is also applied to deciphering portion 23 of the secure voice module. Otherwise, deciphering portion 23 is preset with the enciphering code commonly used by all mobile stations. As a result of setting the secure voice module with the proper code(s), the base station is conditioned to properly decipher and encipher voice transmissions from and to the calling mobile station.

Terminal 21 can also supply a secure control signal on line 45 to switch control 29 which activates switch 27 upon completion of the exchange of tone signalling information between base station 11 and the calling mobile station. This automatically sets the base station to the secure mode. Terminal 21 may wait until a called station has answered the call before supplying the secure control signal to line 45. If the latter arrangement is used, terminal 21 would determine that a called party has answered a call by detecting for a lifting of the hand set in the case of a called land line party or the completion of tone signalling between base station 11 and a called mobile station in the case of a called mobile station. As an alternative arrangement, terminal 21 may wait for a secure service request signal from a calling or called party before supplying the secure control signal. This request permits system users to decide if a secure mode and its consequent higher billing expense, is desired.

When terminal 21 applies the secure control signal to line 45 it causes switch control 29 to activate switch 27 and connect the enciphering output of the secure voice module to transmitter 19. Thus all voice transmissions on line 43 from the called party are routed through enciphering portions 25 of the secure voice module. From there the called party transmissions pass through switch 27, transmitter 19, duplexer 15 and the antenna 12 and are received at the mobile station by antenna 14, duplexer 51, and receiver 53. Voice transmissions from the called party received at the calling mobile station are also routed from the output of receiver 53 through the mobile station deciphering portion 61 of the secure voice module and the deciphered voice transmissions are then applied to the usual mobile station audio (voice) circuits (not shown).

The deciphering output of the secure voice module is monitored by logic circuit 59 which, upon the detection of a signal appearing thereat indicating reception of an enciphered transmission, applies a secure control signal to switch control 65 causing it to operate switch 67 and interconnect the output of the enciphering portion 63 of the secure voice module with transmitter 55. As a result, all voice transmissions from the mobile station are enciphered with the mobile station code and transmitted to the base station.

BASE STATION INITIATED CALLS

When a call is initiated to a mobile station 13, for example, from a land line party 22, or another mobile station, terminal 21 conducts all call initiating and hand shaking tone signalling with an addressed mobile station over signalling line 41, switch 27 and transmitter 19 in conventional fashion. The addressed mobile station and logic circuit 57 receives tone signalling information transmitted from the base station via line 71 and operates thereon in conventional fashion to acknowledge receipt of the call by sending appropriate hand shaking tone signalling information over line 77 through transmitter 55 and back to the base station 11.

When hand shaking tone signalling between the base and called mobile station is completed, base station terminal 21 may apply a secure control signal to line line 45 causing switch control 29 to connect switch 27 to the output of enciphering portion 25 of the secure voice module through which voice signals from a calling mobile or land line party are routed. Alternatively, as discussed above, the secure control signal may be provided only after terminal 21 detects the presence of a secure service request signal from a calling or called party. Terminal 21 also supplies the called mobile station address to decoder 31 which causes generator 33 to supply code programmer 35 with the appropriate code for the called mobile station. This code is furnished by code programmer 35 to the deciphering and enciphering portion of the programmable secure voice module if the mobile stations encipher using their unique code; otherwise, if a common mobile station enciphering code is used, the deciphering portion 23 of the base station secure voice module will be preset with this common code. Accordingly, properly enciphered and deciphered voice information is transmitted to and received from the called mobile station through enciphering portion 25 and deciphering portion 23.

At the called mobile station the deciphering portion 61 output of the secure voice module is monitored and, when reception of an enciphered voice transmission is detected by logic circuit 59, a secure control signal is applied to switch control 65 which causes switch 67 to interconnect the enciphering portion 63 output of secure voice module with the input to transmitter 55, thus completing the switching of the system to the secure mode.

Upon completion of a call, terminal unit 21 of the base station operates in the usual manner to revert the base station to a ready state. In addition, terminal 21 removes the secure control signal from line 45, thereby allowing switch 27 to revert back to a connection with signalling line 41. Likewise, the logic circuit 57 in the mobile station also detects completion of a call and applies a signal to detect circuit 59 causing it to remove the secure signal from switch control 65 thereby allowing switch 67 to revert back to connection with signalling line 77.

As is apparent from the above, the described FIG. 1 exemplary embodiment permits a mobile telephone system with which it is used to conduct the usual tone signalling incident to establishing a communication channel between a base station and mobile in a "clear" mode whereby all system signalling functions, including those requiring the furnishing of a common signal to all remote stations, can be retained without modification, while further permitting the voice transmissions of the system to automatically, or in response to a secure service request, be conducted in a secure mode with each mobile station being assigned at least its own unique deciphering code, thereby ensuring complete privacy for voice transmissions.

Thus far, it has been assumed that all mobile stations of a system are entitled to secure service which is established automatically, or only in response to a secure service request, upon completion of tone signalling. The mobile telephone system may also be arranged with some mobile stations being entitled to secure service, while others are not. In this case, terminal 21 can be arranged to determine if a secure class of service is available to a particular mobile station which is communicating with the base station. If it is not, terminal 21 will not supply the secure service control signal thereby retaining the clear mode for voice transmissions.

The embodiment of FIG. 1 shows the base station use of a secure voice module permanently associated with a transmitter/receiver channel of a mobile telephone system. Additional like secure voice modules would be required in the base station in association with the additional communications channels thereof.

Figure 2:
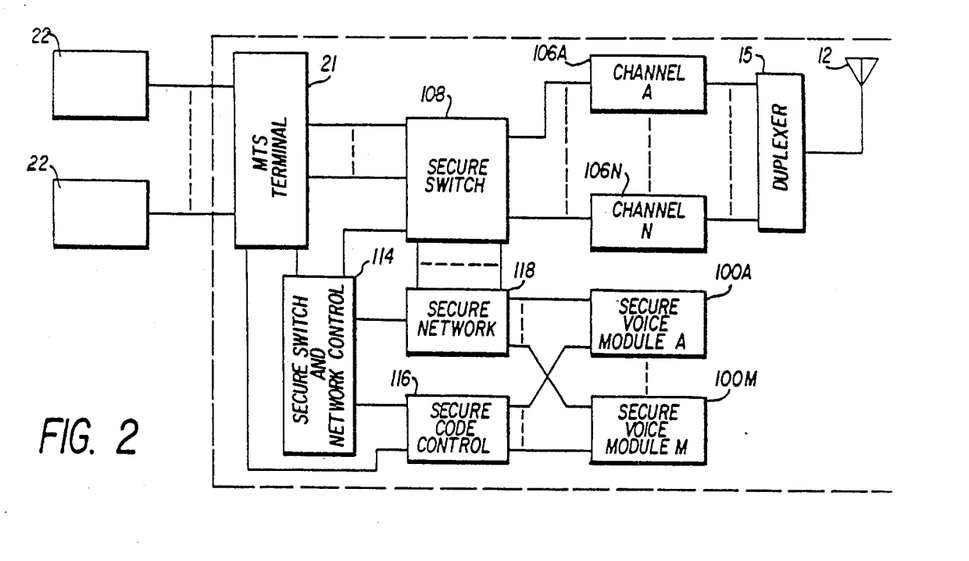
FIG. 2 illustrates a second base station embodiment.

An alternative to providing secure voice modules permanently assigned to each channel of the system is shown in FIG. 2 wherein a bank of secure voice modules is shown from which a secure voice module can be selectively connected to a channel of the system, and appropriately code programmed as needed.

Any one of a bank of secure voice modules 100A–100M can be seized and inserted into an established communication path automatically upon completion of tone signalling and a determination by terminal 21 that a security class of service is available to a calling or called mobile station, or only if a mobile station entitled to security service elects to use the secure mode of operation by sending the terminal a secure service request signal, e.g. a dial code signal. Each of the secure voice modules 100A–100M includes a deciphering and enciphering portion, as in the FIG. 1 embodiment, to provide secure voice communications in both directions. The base station includes an antenna 12 connected in the usual manner through a duplexer 15 to a plurality of channels 106A–106N, each of which includes a transmitter and receiver for transmitting signals to and receiving signals from, the mobile stations. Each of the channels 106A–106N is connected through a secure switch 108 to the terminal 21 and also through the switch 108 to a secure network 118. In the clear mode of operation, the channels 106A–106N are connected directly through the switch 108 to the terminal 21.

As previously mentioned, a communications path between the calling and the called parties will be established in the conventional clear manner. In the event a secure connection is to be established, the connection can be automatically made upon completion of tone signalling and a determination that the calling party is entitled to a secure class of service, or it can be made after either a calling or called party dials a special code requesting secure service after the non-secure connection has been established. The terminal 21 can record the existence of secure connection so that both parties can be billed for the added service, or only the party requesting secure voice service can be billed.

When a secure voice connection is desired, MTS terminal 21 activates secure voice switch 108 and network control 114 to seize a free one of the source voice modules 100A–100M. Simultaneously, terminal 21 enables a secure code control 116 which presets the seized secure voice module with an enciphering/deciphering code corresponding to that of a mobile station with which the secure connection is to be established. As in the FIG. 1 embodiment, only the enciphering portion of the secure voice modules 100A–100M need be programmable with the unique mobile station code, if all mobile stations use a common enciphering code. The code programming can be performed using the decoder 31, code generator 33 and code programmer 35 of FIG. 1 described above. A secure connection is established between terminal 21 and the channel to be involved in the secure connection through the switch 108, the network 118, and the selected secure voice module 100A–100M for enciphering and deciphering of the voice communications. The secure connection is held by terminal 21 until call completion.

Figure 3:
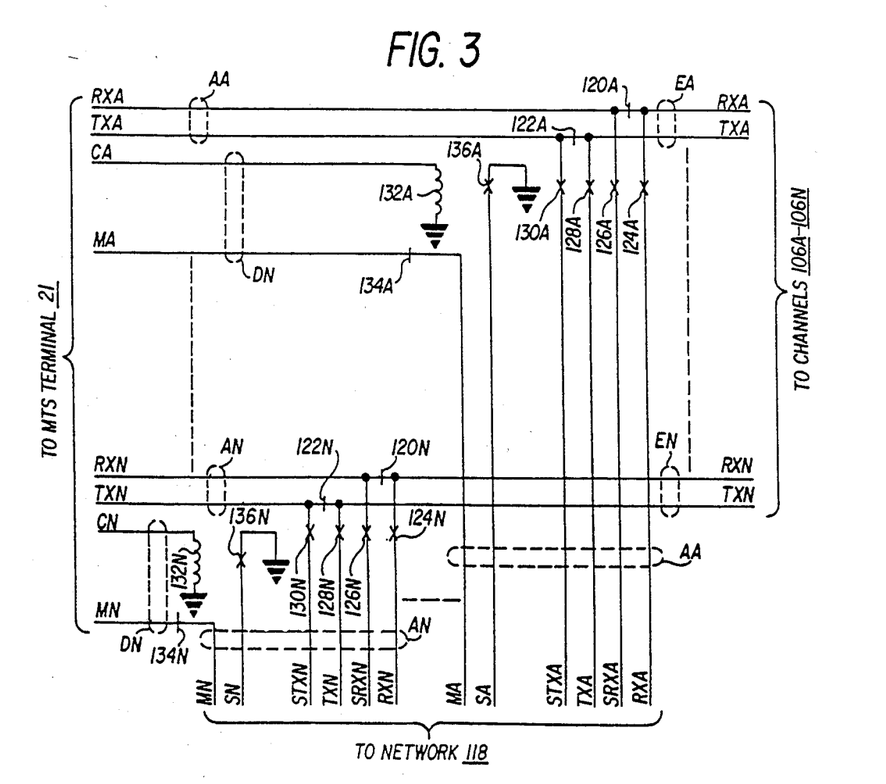
FIG. 3 illustrates a greater detail the secure switch of FIG. 2.

FIG. 3 is a schematic diagram of the secure voice switch 108. The switch 108 includes a separate relay circuit 132A–132N for each of the channels 106A–106N. To simplify the explanation, the receiver lines (RX) and transmitter lines (TX) from each of the channels have been illustrated as single connections. Under normal non-secure voice operation, the receiver and transmitter lines RXA–RXN and TXA–TXN are connected to the terminal 21 through the normally closed contacts 120A–120N and 122A–122N respectively. Since the relay circuits 132A–132N are identical for each of channel 106A–106N, only the lines RXA and TXA associated with channel 106A will be explained in detail. The opposite ends of the normally closed contacts 120A–122A are connected to the networks 118 through normally opened contacts 124A and 126A, and 128A and 130A, respectively. The relay 132A also includes a mark contact 134A and a seize contact 136A. All the contacts of relay 132A are operated by the energization of the relay 132A. The relay 132 can include make before break contacts to assure the connection is maintained while changing to a secure mode of operation.

Upon completion of communications path establishing signalling, or after a determination by terminal 21 that a called or calling party has requested secure voice operation, a signal is applied to one of the mark terminal M1–MN corresponding to the channel associated with the mobile station with which a communication path has been established. Assuming channel 106A has been selected for secure voice operation, the line M1 is marked. The absence of a ground on the seize line S1 indicates that the channel 106A is not busy. If a free one of the secure voice modules 100A–100N has been located and seized, and the connection through the network 118 established, the terminal 21 will operate the relay 132A, which removes the mark signal on lead M1, and applies a ground signal on lead S1 to secure the connection.

Figure 4:
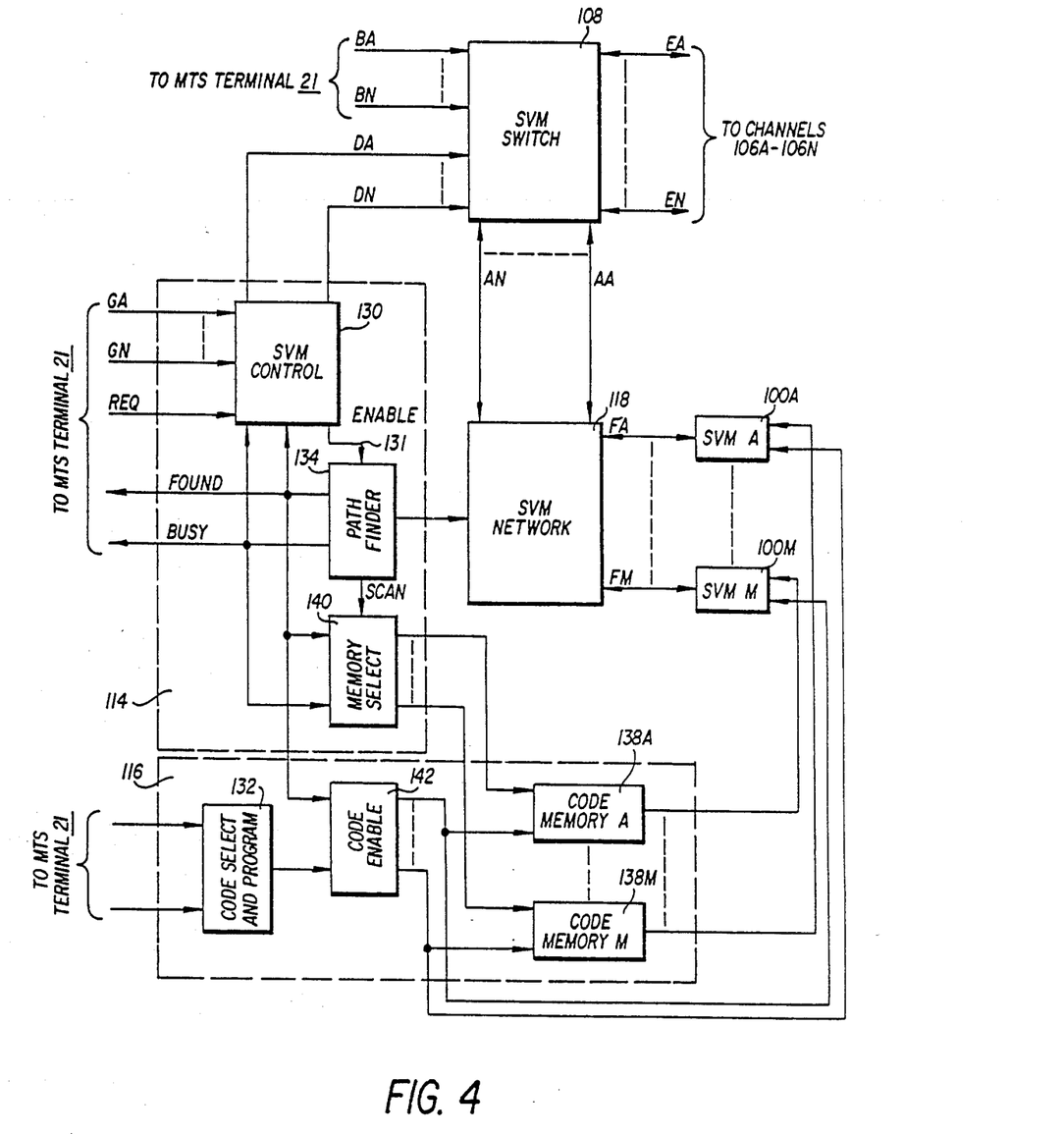
FIG. 4 illustrates in greater detail the network control and the secure code control of FIG. 2.

FIG. 4 illustrates in somewhat more detail the secure switch and network control 114 and the secure code control 116 of FIG. 2. In FIG. 4 the leads EA and EN connected between the switch 108 and the channels 106A–106N include the leads RXA and TXA–RXN and TXN shown in FIG. 3. The leads AA and AN between the network 118 and the switch 108 include the lines RXA, SRXA, TXA, STXA, SA and MA-RXN, SRXN, TXN, STXN, SN and MN, also shown in FIG. 3. RX is a receive channel line to a secure voice module 100. SRXA is a secure receive line from a secure voice module. TXA is a transmit line to a secure voice module, STXA is a secure transmit line from a secure voice module. SA is a seize line and MA is a mark line. The leads DA-DN between a secure voice module control circuit 130 and the switch 108 include the control lines CA-CN and the mark lines MA-MN. The leads BA-BN connected between switch 108 and terminal 21 correspond to the leads RXA and TXA-RXN and TXN respectively. The leads FA-FM between the secure voice modules 100A-100M and network 118 include the audio (voice) and digital (enciphered/deciphered) signal lines, and the control lines.

Automatically upon completion of tone signalling, or in response to a request for a secure voice connection, terminal 21 applies a signal on one of the lines GA-GN (corresponding to channels 106A-106N respectively) to identify to a secure voice control circuit 130 which of the channel connections is to be converted into a secure connection. In addition, terminal 21 applies a secure request signal to the control circuit 130 to enable the control circuit 130 to place a mark signal on one of the leads DA-DN corresponding to the channel involved in the secure connection. Each of the secure voices modules 100A-100M has a separate code memory 138A-138M associated therewith for receiving the unique code of the mobile station with which it is being connected. Terminal 21 selects the appropriate code with a code select and programmer 132 that corresponds to the mobile unit to be inserted into the selected code memory 136A-136M. Code select and programmer 132 may include the decoder 31, and generator 33 and code programmer 35 of FIG. 1. For common code enciphering by the mobile station, the code memory 136A-136M will only program the enciphering portion of the secure voice modules 100A-100M as the deciphering portions can be preset with the common enciphering code used by all mobile stations.

The network 118 is a typical single stage, telephone matrix type crosspoint or crossbar switching network capable of connecting any one of the free secure voice modules 100A-100M to any one of the lines AA-AN marked for connection. In operation, the control circuit 130 activates a conventional telephone path finding circuit 134 to scan through network 118 and the bank of secure modules 100A-100N to locate a free circuit and then seizes such free circuit for connection. In the event that none of secure voice modules are free, as can be detected, for example, by two complete scans of the path finder 134, a busy signal is sent to the control unit 130 and terminal 21 indicating that a secure voice connection cannot be established. On the other hand, if a secure voice module is free, the path finder 134 will seize such free circuit for the connection and will send a found signal to the MTS terminal 21 and to the control unit 130 indicating that a connection can be completed.

A memory select circuit 140 includes a scanning circuit which scans the code memory circuits 138A-138N in synchronism with the path finder 134. When a free path is found and a secure voice module 100A-100N is seized as previously described above, the found signal from the path finder 134 is applied to the memory select circuit 140 enabling the corresponding code memory circuit 138A-138N to receive the code of a mobile station with which a secure connection is being established. The found signal from the path finder 134 is also applied to a code enable circuit 142 which enables the code selected by terminal 21 and the code select and programmer 132 to be applied to the selected code memory 138A-138N.

With the alternate embodiment illustrated in FIGS. 2-5, a secure voice module circuit 100A-100N can be selected and inserted into an established communications channel upon completion of tone signalling or only at the request of a mobile station, and the secure voice module will automatically be programmed to include at least the unique deciphering code assigned to the mobile station. Once a secure connection is established, the connection will be maintained by terminal 21 until completion of the call. Thereafter, terminal 21 will signal the control circuit 130 to de-energize the corresponding one of the relays 132A-132N in the switch 108 and the non-secure voice connection will be re-established, or dropped.

Figure 5:
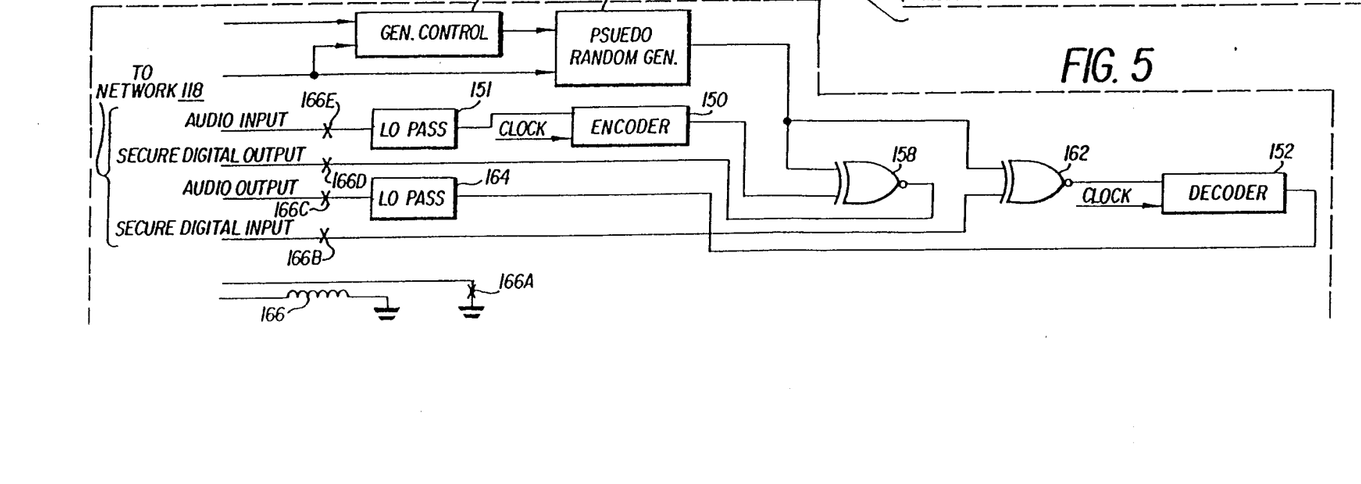
FIG. 5 illustrates in greater detail a secure voice module of FIG. 2.

A representative secure voice module which may be used in the FIG. 2 embodiment of the invention is illustrated in FIG. 5. It includes an encoder and modulation circuit 150 functioning as an analog to digital converter and a decoder and modulation circuit 152 functioning as a digital to analog converter. The encoder and decoder circuits 150 and 152 are commercially available from Harris Corporation under the part number designation HC-55516/55532 and are fully described in semiconductor brochure No. HC-55516/32 (July 1977) and Harris Semiconductor Products Division application note 607 January 1979). The encoder circuit 150 receives audio signals to be encoded from a low path filter 151 and converts the audio signals to digital signals. The digital signals are applied to a gate 158 along with signals from a psuedo random generator circuit 156 to produce enciphered digital signals. The code of the psuedo random generator circuit 156 is controlled by a generator control circuit 160 which receives its enciphering/deciphering code key from the code memory circuit 138 (FIG. 2). The enciphered digital signals to be deciphered are applied to a gate circuit 162 along with signals from the psuedo random generator 156 (having the same code as applied for enciphering) so that modified digital signals are applied to the decoder 152, which in turn develops the audio signals and transmits the audio signals through a low pass filter 164. Of course, if different enciphering and deciphering codes are used, a separate psuedo random generator circuit and generator control circuit will be required for the respective enciphering and deciphering portions of the secure voice module.

For the FIG. 2 embodiment each secure voice module 100A-100M also includes a relay 166 which is energized by the path finding circuit 134 through the network 118. The energization of the relay 166 closes the contacts 166A applying ground to the line S indicating that the secure voice module has been seized and is busy and also closes contact 166B-166E completing the connection between the secure voice module and the network 118. When this secure connection is dropped, the relay 166 is de-energized and the secure voice module is released for subsequent connection to a secure call.

The FIG. 5 secure voice module can also be used in the FIG. 1 base station embodiment except relay 166 and its associated switching contacts would not be needed.

Operation of the FIGS. 2 through 4 base station proceeds through the clear signalling operation and secure voice operation in the same manner as the above described operation for the FIG. 1 base station. The only difference being that, when a secure mode is to be established, terminal 21 causes a free one of a plurality of secure voice modules 100A-100N to be connected in an established communications path with a communicating mobile station.

Although exemplary embodiments of the invention have been described with reference to particular structures, it is to be understood that various modifications can be made thereto without departing from the spirit and scope of the invention. Accordingly, the invention is not limited by the above description but only by the attached claims.

I claim:

1. In a radio frequency mobile telephone communications system having a central station and a plurality of remote stations, each said central and remote station comprising signalling apparatus for establishing one of a plurality of information transmission channels between said central station and a particular remote station and information transmission for exchanging information between said central station and particular remote station over the established information channel, the improvement comprising:
    first means in said central station for enciphering information signals sent to said particular remote station in accordance with a first code unique to said particular remote station;
    second means in said particular remote station for detecting the receipt of an information signal sent from said central station which was enciphered with said first code; and
    third means in said particular remote station responsive to the detection of receipt of an enciphered information signal by said second means for enciphering with a second code an information signal and sending said enciphered information signal from said remote station to said central station.

2. A communications system as in claim 1 wherein said first and second codes are the same.

3. A communications system as in claim 1 wherein said first and second codes are different.

4. A communications system as in claim 1 wherein said central station includes means for initiating a call to called parties in reponse to called party signalling signals received from a calling remote station, each said remote station including means for transmitting to said central station signalling signals including an identification address unique thereto as well as an identification address of a called party.

5. A communications system as in claim 4 further comprising means in said central station responsive to receipt of signalling signals from a calling remote station for determining a first code which is unique to said calling remote station and for applying said first code to said first means.

6. A communications system as in claim 1 wherein said central station further comprises means for calling a remote station in response to signals received from a calling party, and means responsive to an identification address of a called remote station, received from said calling party, for determining a first code unique to said called remote station and for applying said first code to said first means.

7. A communications system as in claim 6 wherein said central station includes means for deciphering with a second code enciphered audio voice signals received from said remote stations and each said remote station includes means for deciphering with said first code enciphered audio voice signals received from said central station.

8. A communications system as in claim 7 wherein said first and second codes are the same.

9. A communications system as in claim 7 wherein said first and second codes are different.

10. A communications system as in claim 1 wherein said information channel is established using tone signalling signals and said central station comprises:
    a receiver for receiving tone signalling and enciphered information signals transmitted by said remote station;
    a transmitter for transmitting tone signalling and information signals to a said remote station;
    a deciphering means connected to the output of said receiver for deciphering received enciphered information signals,
    an enciphering means for enciphering information signals in accordance with said first code supplied thereto;
    a code programming means for setting said first code into at least said enciphering means;
    means for providing tone signalling signals to said transmitter and responsive to received tone signalling signals from said receiver for establishing a communications path with a particular said remote station, said tone signalling providing means providing an identification address signal of said particular remote station, and a secure service control signal;
    means for deriving said first code from said identification address signal and applying said first code to said code programming means; and,
    a switch means responsive to said control signal for selectively applying the output of said means for providing tone signalling signals or the output of said enciphering means to said transmitting means.

11. A communications system as in claim 10 wherein said means for providing supplies said secure service control signal upon the establishment of said communications path with a particular remote station.

12. A communications system as in claim 10 wherein said means for providing supplies said secure service control signal in response to receipt of a secure service request signal.

13. A communications system as in claim 10 wherein said switch means selectively connects a secure voice module containing said enciphering means and deciphering means in said communications path and said communications system further comprises at said central station:
    a plurality of secure voice modules each containing an associated enciphering and deciphering means; and
    means responsive to said control signal for selecting a free one of said secure video modules for connection in said communications path by said switch means, at least the enciphering means of said selected secure voice modules being programmed with said code.

14. A communications system as in claim 1 wherein said information channel is established using tone signalling signals and each said remote station comprises:

a receiver for receiving tone signalling and enciphered information signals transmitted by said central station;

a transmitter for transmitting tone signalling and enciphered information signals from said central station to said base station;

a deciphering means connected to the output of said receiver for deciphering received enciphered information signals in accordance with a first code signal unique to said remote station;

means for providing communications channel establishing tone signalling signals;

an enciphering means for enciphering audio voice signals;

means for providing a control signal upon detection of the presence of received enciphered audio voice signals; and, a switch means responsive to said control signal for selectively applying the output of said means for providing tone signalling signals or the output of said enciphering means to said transmitter.

15. A central station for use in a radio frequency mobile telephone communications system containing central station and a plurality of remote stations comprising:

first means for generating signalling signals for establishing one of a plurality of predetermined communications paths with a selected remote mobile station;

second means for enciphering information signals directed to said selected remote mobile station in accordance with a code unique to said selected remote mobile station;

third means responsive to address signals from said remote mobile station identifying said selected remote mobile station for generating and supplying said unique code to said second means; and fourth means coupled to said first, second and third means for first sending signalling signals generated by said first means to said selected remote mobile stations and for thereafter sending information signals enciphered by said second means to said selected remote station in accordance with said unique code as supplied by said third means.

16. A central station as in claim 15 wherein said enciphered information signals are sent in response to establishment of said communications path.

17. A central station as in claim 15 wherein said enciphered information signals are sent in response to receipt by said first means of a signal requesting secure service.

18. A method of communicating between a central station and plurality of remote mobile stations in a radio frequency mobile telephone communication system comprising the steps of:

(a) establishing a sending and receiving information communications path between the central station and a selected one of the remote mobile stations in response to unenciphered signalling communications between the central stations and the selected remote station over one of a predetermined plurality of communication paths,; and (b) sending and receiving enciphered information over the communications path between the central station and the selected remote mobile station, said information being enciphered at the central station in accordance with a code unique to the selected remote mobile station and being applied to the communication path by the central station in response to establishment of the communicating path or in response to receipt by the central station of an unenciphered signal from said selected remote mobile station requesting secure service.

19. A method as in claim 18 wherein the information is enciphered and sent at the central station by the steps of:

(a) identifying the address of the selected remote mobile station from an unenciphered signalling communication;

(b) generating the code unique to the selected remote mobile station responsively to the identified address; and (c) using the code to encipher information and sending the enciphered information from the central station to the selected remote mobile station over the established communications pth.

20. A method as in claim 18 wherein said information is enciphered and sent to said selected remote mobile station by the steps of:

(a) detecting the presence of an enciphered information signal received from the central station; and (b) enciphering information signals in accordance with a code unique to the selected remote mobile station and sending them from the remote mobile station to the central station in response to the detection of an enciphered information signal received from the central station.

21. A radio frequency mobile telephone communications system comprising a base station and a plurality of remote stations;

said base station comprising:

means for establishing clear voice communication with a telephone communications system, means for establishing a clear information transmission channel with a selected one of said remote stations, and means responsive to the establishment of said clear information transmission channel with a selected remote station for selectively enciphering and deciphering voice transmissions to and from said selected remote station in accordance with at least one predetermined code uniquely assigned to said selected remote station;

each of said remote stations comprising:

means for establishing a clear information transmission channel with said base station, means responsive to the establishment of a clear information channel with said base station for selectively enciphering and deciphering voice transmissions to and from said base station in accordance with at least one predetermined code uniquely assigned to said remote station.

22. The communications system as in claim 21 wherein the selective operation of enciphering and deciphering in both said base station and said remote station are controlled by said base station.

23. The communications system as in claim 21 wherein the selective operation of enciphering and deciphering in both said base station and said remote station are controlled by said remote station.

24. The communications system as in claim 21 wherein each of said remote stations uses the same predetermined code for enciphering voice transmissions to said base station and said base station uses said same code for deciphering voice transmissions from said remote stations.

25. The communications system as in claim 21 wherein each said remote station deciphers voice transmissions thereto with a code unique thereto and said base station enciphers voice transmissions to said selected remote station with said unique code.

26. In a radio frequency mobile telephone communication system including a base station and a plurality of mobile stations in which unenciphered communication between a mobile station and the base station may be received and understood by each of the other mobile stations, the improvement wherein:
(a) each of said plurality of mobile stations includes:
  (i) means of sending to the base station an unenciphered request for secure communication,
  (ii) means responsive to receipt of an encoded communication from the base station to encode subsequent transmissions to the base station in a code unique to the mobile station, and
  (iii) means responsive to receipt of an encoded communication for decoding subsequently received transmission from the base station encoded in said unique code; and
(b) wherein said base station includes:
  (i) means for receiving an unenciphered request for secure communications from a mobile station,
  (ii) means for identifying from the request the particular mobile station and for determining the code unique thereto,
  (iii) means for transmitting an encoded communication signal to the mobile station in said unique code,
  (iv) means for decoding subsequently received transmissions from the mobile station in said unique code, and
  (v) means for encoding subsequent transmissions to said mobile station in said unique code;
whereby the base station and one of the plurality of mobile stations may communicate using a code unique to that mobile station in response to an unenciphered request by the mobile station for secure communications.

27. In a method of communicating between the base station and one of a plurality of remote mobile stations in a radio frequency mobile telephone system, the improvement comprising the steps of:
(a) establishing non-secure communications between the base station and one of the mobile stations;
(b) transmitting in the clear from the mobile station to the base station a request for secure communication service;
(c) transmitting an acknowledging signal from the base station to the mobile station in a code unique to the mobile station; and
(d) encoding all subsequent communication.

28. In a method of communicating between the base station and one of a plurality of remote mobile stations in a radio frequency mobile telephone system as in claim 27 wherein the step of encoding subsequent communication between the base station and the mobile station includes the steps of:
(a) selecting one of a plurality of plurality of programmable encode/decode units at the base station in response to receipt of the request for secure communication service from the mobile station;
(b) programming the selected encode/decode unit responsively to receipt of the request from a mobile station with a code unique to that particular mobile station; and
(c) encoding all subsequent transmissions with the unique code.

* * * * *